Dec. 18, 1928.  
A. SCHMID ET AL  
1,696,102

CONTINUOUS CURRENT DYNAMO ELECTRIC MACHINE

Filed April 5, 1927

Patented Dec. 18, 1928.

1,696,102

UNITED STATES PATENT OFFICE.

ANTON SCHMID AND ADOLF STOLL, OF STUTTGART, GERMANY, ASSIGNORS TO ROBERT BOSCH AKTIENGESELLSCHAFT, OF STUTTGART, GERMANY.

CONTINUOUS-CURRENT DYNAMO-ELECTRIC MACHINE.

Application filed April 5, 1927, Serial No. 181,054, and in Germany April 15, 1926.

In order to make small electrical motors reversible, so as to rotate either in left-hand or right-hand sense, ordinarily junction-bars are used which may be laid into one of the positions for properly connecting up the motor electrically to cause it to rotate in the desired direction. These junction-bars may be dispensed with, if at the terminals of the field winding and at the brushes exchangeable cable ends are used which are suspended for some length therefrom. Such cable-ends, however, are inconvenient within the limited interior space of small electrical machines. According to our invention these cable ends are entirely avoided by having the connections for both ends of the field winding fastened on the support for the bearing at the commutator side of the motor and diametrically opposed with respect to the axis of the armature of the motor. In order to change the direction of rotation of the motor it will be sufficient to disconnect the terminals of the field winding and to rotate said support for the bearing at the commutator side against the motor casing through an angle of 180°, whereupon the ends of said field winding may be fixed to the connections serving for the reversal of the motor.

In the accompanying drawing an example of an electric motor is shown which is constructed according to our invention; the motor is shown as being constructed as a four-pole series motor which serves for the starting of combustion engines.

Figure 1:
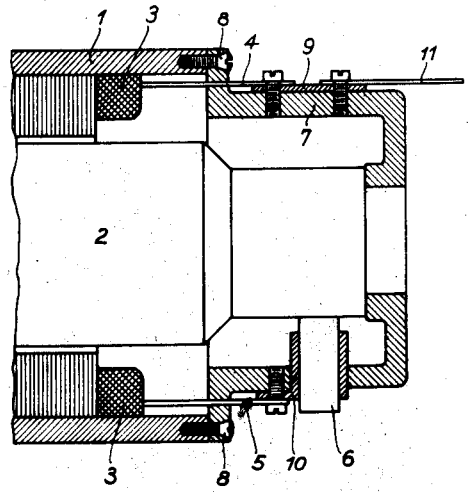
Fig. 1 is a section taken through the commutator side of the new motor.

In Fig. 1, the numeral 1 designates the motor casing, 2 the motor armature, 3 the field winding, 4 and 5 the terminals thereof, 6 one of the brushes and 7 the support for the armature bearing at the commutator side of the motor, said support being fixed by means of screws 8 on the motor casing 1. Two connecting pieces 9 and 10 are provided on the support 7 in such a position that they are displaced relatively to each other by an angle of 180°. The two terminals 4 and 5 of the field winding are passed through the motor casing by means of two diametrically opposed bores, as indicated in the drawing. The terminal 4 may be connected to the connecting piece 9 and the terminal 5 to the connecting piece 10 which leads at the same time to the brush 6. The other brush is positioned rectangularly to said brush 6. A connection 11 leads from the connecting piece 9 to the positive pole of a battery.

When it is desired to reverse the direction of rotation of the armature 2, the terminals 4 and 5 of the field winding of the motor are disconnected from the connecting pieces 9 and 10 and thereupon the screws 8 are released and the bearing support 7 together with both brushes rotated through an angle of 180° and then fixed in such position by the screws 8 to the motor casing 1. The connections for the field winding are thereby reversed; more particularly speaking, the connecting piece 9 will be connected with the terminal 5 of the field winding and the connecting piece 10 with the terminal 4 thereof. The connection between the connecting piece 9 and the battery will not be changed by the rotation of the bearing support 7; in like manner there will be no change in the connection between the connecting piece 10 and the brush 6. The two brushes in their new position with respect to the armature poles will be the same as before, the direction of the current, however, which flows through the field winding will have been reversed so that the armature will rotate in the opposite direction.

Instead of rotating the bearing support 7, or, what will have the same effect, the motor casing through an angle of 180°, the field winding may be displaced with respect to its original position by 180°, for changing the direction of rotation of the motor.

Figure 2:
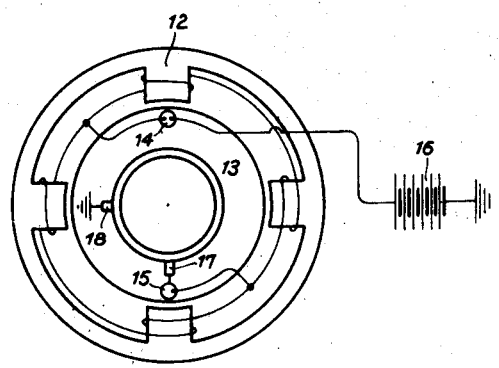
Fig. 2 shows the electrical connections of the same.

This may also be seen from the electrical connections of the motor as shown in Fig. 2, in which the field system is designated by the reference numeral 12 and the bearing support at the commutator side of the motor with the reference numeral 13. The connecting piece 14 is connected with the one terminal of the field winding and connecting piece 15 with the other terminal thereof. In addition to this there is a connection leading from the connecting piece 14 to the battery 16 and from the connecting piece 15 to the positive brush 17. The negative brush 18 is grounded or connected to the body of the motor. In order to change the direction of rotation either the bearing support 13 together with both brushes 17 and 18 or also the field system may be rotated by 180° in order to accomplish the reversal of the motor.

In case the field system of the motor comprises two separate windings, for instance a main winding and an auxiliary winding, the terminals of said windings may be connected in proper sense with corresponding connecting pieces provided at the bearing support. The change of the direction of rotation of the motor will then be accomplished in the same manner as with the single field winding.

We claim:

1. A continuous-current dynamo-electric machine adapted for rotation in forward or reverse direction, said machine comprising a bearing support for the armature, a field winding, and connecting pieces for the ends of said field winding, said connecting pieces being provided on said armature bearing support and positioned diametrically relatively to each other and to the axis of rotation of said machine, and means for securing said connecting pieces in positions with respect to the field-winding which are displaced by 180° relatively to each other, whereby the field-winding connections may be reversed with respect to the armature.

2. A dynamo-electric machine as specified by claim 1, having the terminals of the field winding passing out of the machine casing at points which are positioned diametrically opposite to each other and in proximity to the connecting pieces.

3. A dynamo-electric machine as specified by claim 1, having a bearing support, which is adapted to be fixed at the machine casing in two positiones which are displaced by 180° against each other.

4. In a dynamo-electric machine as specified in claim 1, the arrangement of a four-pole field in combination with commutator brushes arranged at right angles to one another.

In testimony whereof we have hereunto affixed our signatures.

ADOLF STOLL.
ANTON SCHMID.